Oct. 25, 1932.  D. F. SHANKS  1,884,302
MACHINE FOR ENGRAVING CHARTS IN WAX
Filed Dec. 28, 1927   6 Sheets-Sheet 2

Inventor
David F. Shanks.
by
Attorney

Oct. 25, 1932.  D. F. SHANKS  1,884,302
MACHINE FOR ENGRAVING CHARTS IN WAX
Filed Dec. 28, 1927   6 Sheets-Sheet 3

Inventor
David F. Shanks

Witness:

Oct. 25, 1932.  D. F. SHANKS  1,884,302
MACHINE FOR ENGRAVING CHARTS IN WAX
Filed Dec. 28, 1927   6 Sheets-Sheet 5

Patented Oct. 25, 1932

1,884,302

UNITED STATES PATENT OFFICE

DAVID F. SHANKS, OF WINONA, NEW JERSEY, ASSIGNOR TO ROYAL ELECTROTYPE COMPANY, OF PHILADELPHIA, PENNSYLVANIA, A CORPORATION OF PENNSYLVANIA

MACHINE FOR ENGRAVING CHARTS IN WAX

Application filed December 28, 1927. Serial No. 243,099.

My invention relates to devices for marking wax charts as a preliminary step in the preparation of plates for printing charts.

A purpose of my invention is to provide a machine upon which wax charts can be cut completely in an orderly and convenient manner, to reproduce upon the chart any desired straight line or curved lines and to letter accurately in straight or appropriate curved lines wherever desired.

A further purpose is to facilitate the cutting of the wax along right lines capable of exact coordination with respect to the axis of the chart.

A further purpose is to provide for cutting of a wax chart along curved lines concentric with or varying in any desired relation to the axis of the chart.

A further purpose is to provide two rotatable supports for a wax chart, one carried by and rotatable with respect to the other and capable of movement to shift its axis to any extent and any direction desired with respect to the axis of the other.

A further purpose is to mount a rotatable wax chart work holder upon a rotatable bed or support with respect to which the work table can be shifted in parallel planes, and to mount a cutting tool for movement in right line direction with respect to the chart independently of the angular position in which the work holder may be placed.

A further purpose is to provide for exactness of rotarial movement of a wax chart between successive markings upon the chart.

A further purpose is to divide a wax chart up angularly into as many time division as are required.

A further purpose is to facilitate rough setting and nice adjustment of a range of angular movement of a chart carrying member with respect to the tool by which it is to be marked.

A further purpose is to guide arcs upon the surface of a wax chart by holding a guiding tool in stationary position and rotating the chart.

A further purpose is to mount an operating tool upon a straight line guide along which it is movable for positive application to a wax chart.

A further purpose is to provide a tool-carrying rider with a track for guidance during hand manipulation and subject to hand control of the depth and distance of cut and travel.

A further purpose is to provide for exactness of adjustment of the extent of spacing step by step for a tool supporting carrier.

Further purposes will appear in the specification and in the claims.

I have elected to show one only of the different forms of my invention, selecting a form that is practical and efficient in operation and which well illustrates the principles involved.

Like numerals refer to like parts in all figures.

Describing in illustration and not in limitation and referring to the drawings:—

Plates for time recorder charts, whether rectangular or circular normally all include scale-division lines which show some variant condition that is to be recorded such as pressure, temperature or the like, time-division lines which show the time at which the recorded condition existed, and printed matter which is usually made up of figures on different parts of different scales and lettering suitably describing the chart.

Figures 13, 14, 15, 16:
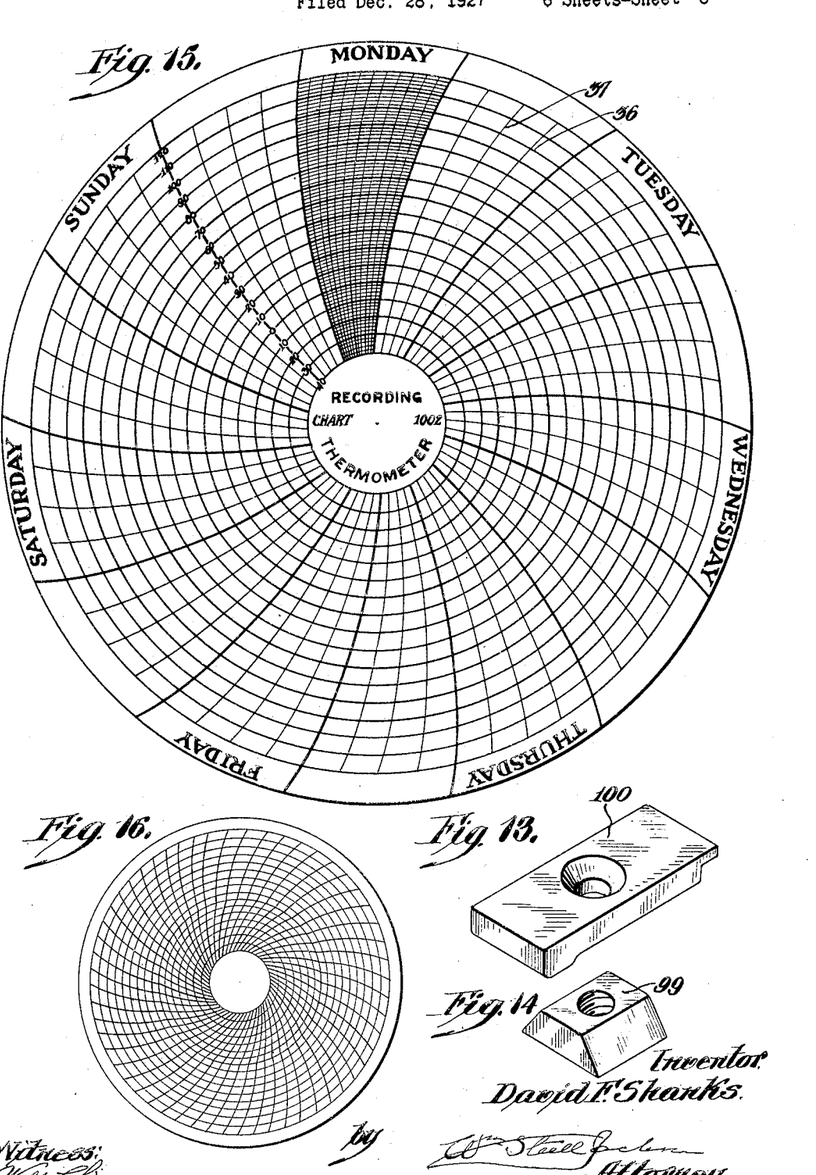
Figures 13 and 14 are perspective views of details shown in Figure 1.
Figures 15 and 16 illustrate typical circular plates made from wax charts engraved by my machine.

With the plates for circular charts, the scale-division lines are usually circles of progressively greater radius. These circles may or may not be uniformly spaced from one another and range from a small inside circle near the center of the chart to a relatively large outside circle that is at a suitable marginal distance inwardly from the outer edge of the chart. The spaces inside the inner circle and outside the outer circle are usually provided with descriptive lettering as indicated, for example, in Figure 15.

The time-division lines extend between the inside and outside scale-division circles. They are always uniformly spaced from one another and are usually arcuate in that the recording pen is usually mounted at the end of a pivoted arm.

In many plates if the arcuate time lines were extended inwardly they would intersect in the center of the chart, but in other plates they would be tangent at uniformly spaced intervals around a small circle about the chart center. Either condition is true according as to whether or not the center of the chart is on or merely near the arc along which the pen of the recorder is adapted to move.

With rectangular charts the scale-division lines are nearly always parallel straight lines that may or may not be uniformly spaced from one another while the time-division lines are either straight or arcuate according to the mounting of the pen, being arcuate when the pen of the recorder moves in an arc and straight when the pen moves rectilinearly.

My invention is well adapted to use in producing wax charts engravings for plates of either type of chart.

I mount a turn-board 30 (Figure 1) upon a suitable table 31 and mount a rotatable work-holder 32 on the turn-board adjustable across the turn-board and provided with an adjustable precision ratchet hand-feed. Above the work-holder and supported at the ends upon the table I mount a movable beam 33 for supporting the engraving tool. The turn-board and the work-holder are separately rotatable and may rotate about the same or different axes.

Figure 1:
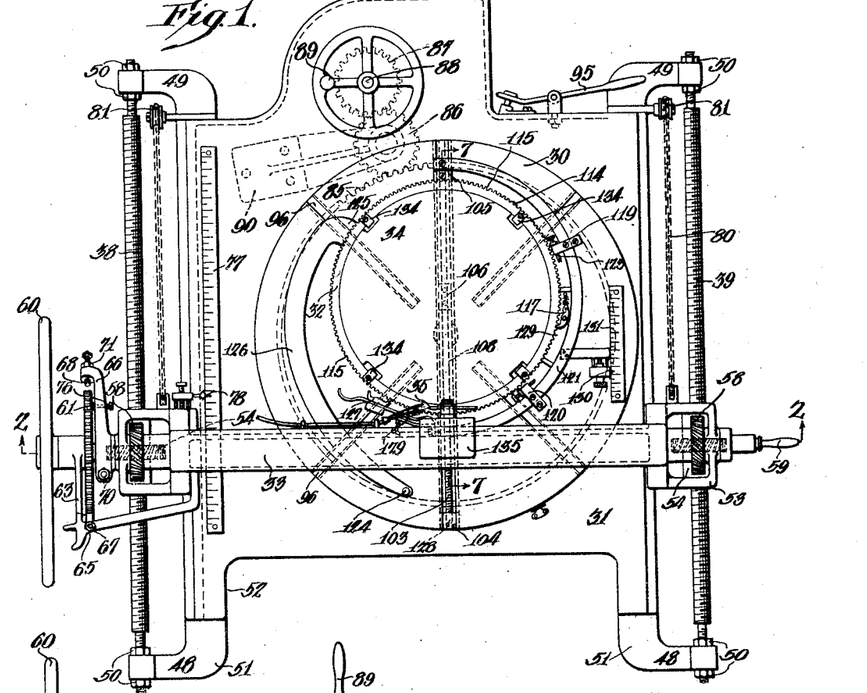
Figure 1 is a top plan view of structure embodying my invention illustrated as in operation upon a wax casing for an electroplate for circular charts.
Figure 2:
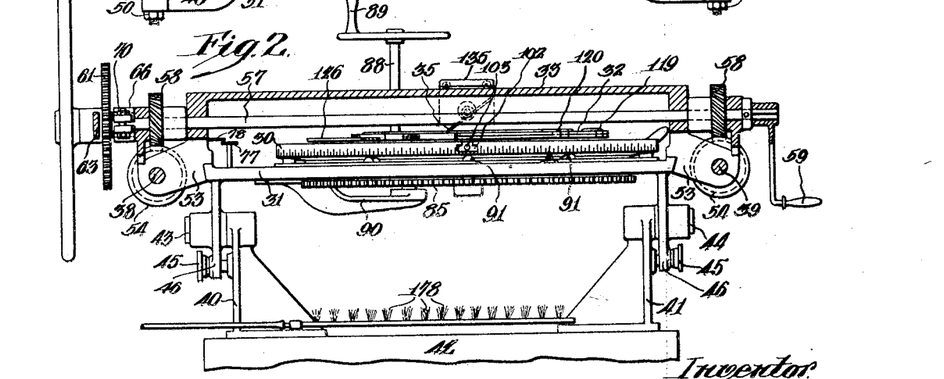
Figure 2 is a vertical section upon the line 2—2 of Figure 1.

The beam is adjustable back and forth across the table above the work-holder and mechanism is provided for exactly positioning the beam at any point and to give it a definite step-by-step hand movement along its range of travel. The wax disc 34 is fastened upon the work-holder.

If the engraving is for a circular chart all of the line engraving operations are done by moving the work with the cutting tool 35 at rest during the engraving of any individual line.

In cutting the scale-division circles 36 (Figure 15) on the chart the tool is set to position at the desired radial distance from the center of the work-chart, which is then given a complete rotation about its own axis, either by rotating the work-holder irrespective of its position on the turn-board or by rotating the turn-board with the work-holder set with its axis coincident with that of the turn-board, the tool cutting a circle in the wax as the support (case) containing the wax rotates.

The other circles are cut in the same way, the tool being reset after each operation without changing the bodily position of the work-holder.

There is provision, as later described, whereby it is very easy to move the tool to any desired exact position or desired distance from a preceding setting.

In drawing the arcuate time-division lines 37 (Figure 15) the workholder is eccentric with respect to the turn-board, carrying the work-holder, and the tool is set at a distance from the pivotal axis of the turn-board equal to the desired radius of the arcuate time-division lines. For any given arc the rotary work-holder axis is shifted away from the turn-board axis to a distance equalling the radius of the arc. This should equal the radius of pen movement, i. e., the distance from the pen axis to the chart axis.

If the work-holder be now swung about the axis of the turn-board, the axis of the work-holder and hence the axis of the work will describe the desired arc and the stationary cutting tool when set at a distance from the axis of the turn-board equal to this radius will cut the desired arc.

The arcuate time-division lines are then engraved (i. e., cut in the wax) during successive angular movements of the turn-board. In each of these movements the wax disc (chart) travels past the stationary cutting tool from a point at which the tool cuts the outside circle to a point at which it cuts the inside circle of the chart. After a cutting movement is completed the tool is raised from the work and the turn-board 30 is oscillated backward so that the initial circle of the chart for example the outer circle, engages the tool. The work-holder 32 is then given an angular movement on its own axis sufficient to bring it into position for the next line, which is cut by repeating the forward movement of the turn-board on its pivotal axis.

Straight lines, such as are required in rectangular wax charts, are cut by moving the tool along its supporting beam while the work is held stationary. For a series of parallel straight lines such as the scale division lines for rectangular charts the work remains stationary and the beam is shifted to different positions for the successive cutting movements of the tool.

For a series of parallel curved lines, such as the time-division lines of some rectangular charts, I keep the tool stationary at the desired radius distance from the axis of the turn-board, cut each line by rotating the turn-board through the requisite angle and shift the wax casing to different positions across the turn-table for the different lines by shifting the work-holder 32.

The table, (Figures 3, 4 and 6), 31 supports the turn-board 32, gear mechanism for operating the turn-board and parallel screws (bars) 38 and 39 that carry and provide for adjustment of the tool holder beam 33. The table is itself supported upon suitable standards 40 and 41 that are in turn mounted upon a base 42.

Preferably the table is made angularly adjustable with respect to the horizontal, it preferably being set horizontal or at any desired slope with the horizontal, according to operating conditions or to the individual preference of the operator.

In the illustration the table is pivotally mounted upon horizontal alined pins 43 and 44 in the standards, and is locked in any one of a number of different angular positions by means of lock pins 45 carried in downwardly extending table projections 46. The pins screw alternatively into any alined pair of threaded holes 47 in the standards.

The parallel screws 38 and 39 carrying the tool beam 33 are threaded throughout their length and are clamped at opposite ends to lugs 48 and 49 extending from the table. Nuts 50 are provided upon each side of each lug so that each end of each bar is tightly clamped into its lug.

The lugs 48 at the front end of the machine extend forwardly at 51 in order to give additional length to the screw bars and the table is preferably cut away between these lugs at 52 to permit more easy access to the turn-board.

The beam support 33 of the tool is preferably of inverted channel section. Each end of the beam is provided with a diagonally downward extending portion 53 which houses opposite ends of a spiral gear nut member 54 threaded upon the screw bar. The beam also carries longitudinally spaced bearings 55 and 56 for an operating shaft 57. The bearings are located on opposite sides of a spiral gear 58 meshing with the gear 54.

The spiral gears 58 are fastened rigidly to the shaft 57 and not only drive the gears 54 but ensure that they turn to the same extent.

The shaft 57 extends along the interior of the channel beam 33 from one end to the other, carrying rigidly fastened to it a handle 59 at one end and at the other end loosely mounted upon it a hand wheel 60 for operating ratchet feed mechanism.

The shaft 57 is adapted to be ratcheted in either direction by mechanism which assists the feed without preventing control of the shaft and quick movement of the shaft in either direction by the handle 59 or by the wheel 60.

The reversible ratchet-feed of the shaft 57 (Figures 3 to 6 and 12) includes a ratchet wheel 61 fastened to the shaft, a three-position pawl member 62 mounted near the outer end of a circumferentially movable arm 63 that extends outwardly from a sleeve 64 rigid with wheel 60 and loosely mounted on the shaft, a permissibly fixed stop 65 and an angularly adjustable stop 66. The latter is "fixed" when it has been set.

Figures 6, 12:
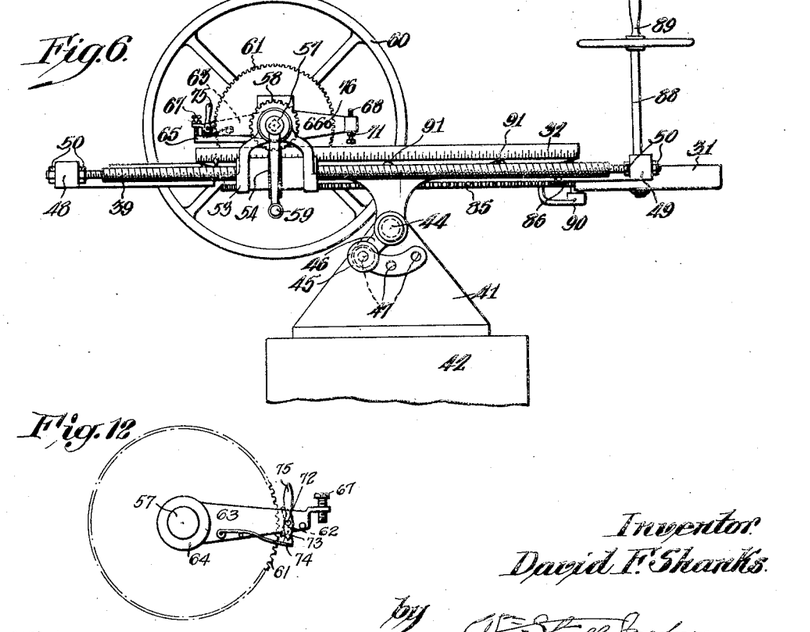
Figure 6 is a right side elevation of the structure seen in Figures 3 and 4.
Figure 12 is an enlarged side elevation of ratchet mechanism shown in Figures 1 and 2.

Set screw 67 is carried by the movable arm 63 and is adapted to be set at any position in it by lock nut 67' (Fig. 6). It engages fixed stop 65 in one direction of movement of the arm and adjustable set screw 68 in arm 66 at the other end of its arc of movement.

The arm 63 carries a three position pawl adapted to engage with the teeth 61 in either of its extreme positions, to ratchet in different directions and lie in natural position between these extremes.

Since the arm 63 swings with the wheel 60 and can be ratchet-connected with the shaft 57, the wheel 60 controls ratchet operation of the shaft. Any extended rotation of the shaft in the same direction can be taken care of by handle 59.

The adjustable stop 66 is mounted upon a reduced sleeve portion 69 of the beam by means of a split clamp so as to be capable of movement about this sleeve portion to any desired extent and to be capable of being clamped to the sleeve portion in set position by means of any suitable fastening such as is shown, for example in bolt 70

Approximate adjustment in the distance between the stops 65 and 66 is made by loosening the bolt 70 and angularly adjusting the member 66 and, after re-tightening the bolt 70, close adjustment is made by suitably changing the screw 68 which is provided with a lock nut 71 for definitely setting the screw in any desired position.

The three-position pawl member is best seen in Figure 12 and comprises a crescent-shaped pawl 62 rigidly fastened to its pivot pin 72 that carries a click member 73 in turn rigidly fastened to the pivot.

A cooperating spring 74 mounted upon the arm 63 is adapted to spring-press the pawl so that either horn is pressing inwardly on to the teeth of the ratchet wheel, or so as to maintain both horns out of engagement with the ratchet teeth according to the position of a handle 75.

It will be evident that when the click handle 75 is pushed inwardly the upper horn of the double pawl presses into the ratchet teeth, that when the handle is in mid-position neither horn is in engagement, and that when the handle is pulled to its outer position the lower horn presses into the wheel teeth.

When the handle is set in mid-position the beam may be moved along the screw bars 38 and 39 in either direction by turning the handle 59 or hand wheel 60, and when the handle 75 is in inner or outer position the beam may be moved in one direction or the other by oscillating the ratchet.

Desirably the shaft 57 is provided with a brake member sufficiently strong to prevent any danger of the ratchet wheel from having any movement of its own except that due to the forward movement of the hand-wheel.

In practice this brake conveniently comprises a screw member 76 mounted in the arm of the adjustable stop member 66 and having a fiber- or leather-covered head adjustably pressing against the face of the ratchet wheel.

The position of the beam with respect to the table is indicated by a suitable scale 77 fastened to the table and a cooperating pointer 78 fastened to the beam.

The beam mechanism having considerable weight is preferably counterweighted whenever the table is set at any considerable slope.

When the table is set horizontal counterweighting is, of course, unnecessary and at other times the counterweighting is made variant according to the degree of slope at which the table is used.

Figure 5:
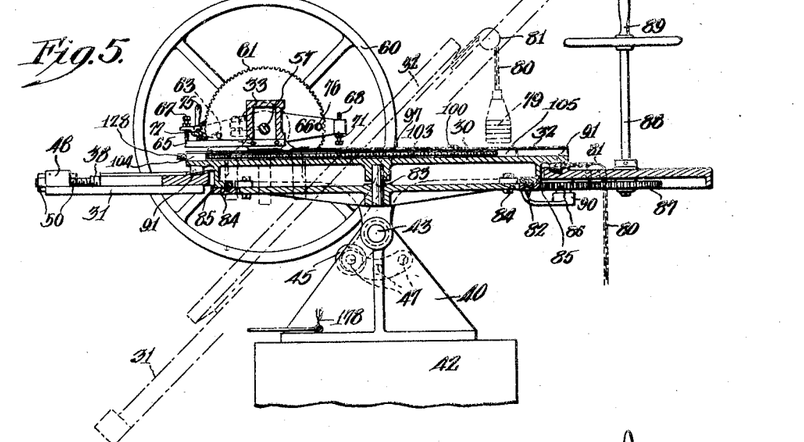
Figure 5 is a section taken upon the line 5—5 of Figure 3 and gives a dot-and-dash indication of one of the parts in a different position.

As illustrated, the counterweighting is effected by suitable weights 79 (Fig. 5). Flexible connections 80 from opposite ends of the beam pass over pulleys 81 to support the weights, which are adjusted to suit the slope of the table.

The table is provided with a suitable opening 82 to receive the circular turn-board 30 which is pivotally supported upon a thrust bearing 83 carried by transverse portion 84 (Fig. 5) of the table.

The turn-board is provided with gear teeth 85 around the periphery of a lower portion. The gear teeth 85 mesh with an idler 86 that in turn meshes with a gear 87 upon the lower end of a shaft 88 carrying an operating handle 89 above the table (Fig. 1).

The idler 86 is supported by a suitable bracket 90 and the shaft 88 is journaled in any suitable way upon the table. The turn-board may be rotated in either direction, whenever it is free to rotate, by turning the handle 89.

Suitable roller support 91 is preferably provided near the outer circumference of the turn-board.

I have found it desirable to adapt the turn-board to easy registry in positions that are precisely ninety degrees apart in that in many cases the engraved lines for rectangular charts are two series of parallel straight lines, each series being at an angle of ninety degrees to the other.

When engraving a wax chart for a plate of this type, the chart case is conveniently mounted directly upon the turn-board, the work-holder 32 having been lifted out of the way. One set of straight lines is made with the turn-board in one position and then the board is turned through ninety degrees and the other set of lines is cut.

I show a pin 92 (Figure 3) slidably mounted in a radially directed guiding portion 93 of the table and adapted to register alternatively with suitable radial sockets 94 in the periphery of the turn-board, the sockets being ninety degrees apart.

The pin 92 is movable back and forth in its bearing 93 by means of a suitable lever mechanism 95.

When the pin is in any one of its sockets it locks the turn-table from rotary movement, and at other times the turn-table may be freely rotated by the handle 89.

Figure 3:
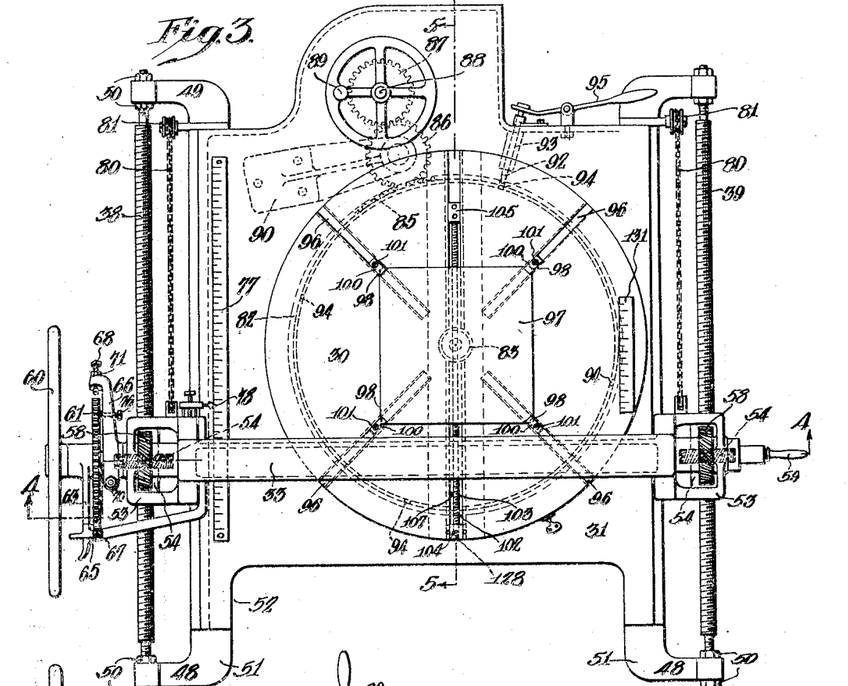
Figure 3 is a plan view of structure shown in Figure 1 with some of the parts removed.
Figure 4:
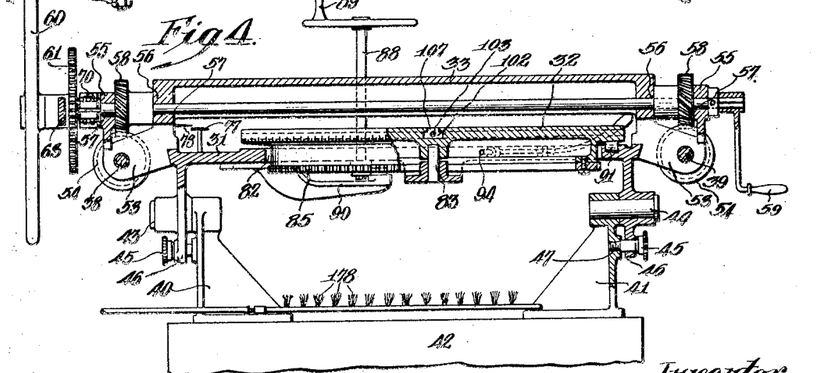
Figure 4 is a section taken upon the line 4—4 of Figure 3.

The top of turn-board is provided with four radial T-slots 96 for use when clamping work of various sizes to place upon the table, and Figure 3 shows a holder 97 for a wax chart, usually called a case, clamped to place upon the turn-board at the corners of the casing by clamp members 98.

Each clamp comprises a nut member 99 (Figure 14) adapted to slide along one of the radial T-slots, a dog member 100 (Figures 3 and 13) above the board and a screw 101 adjustably threading into the nut and pulling the dog downwardly into engagement with the top of the table at one end and the top of the work at the other.

When a wax chart is to receive only straight lines the turn-board and tool members are sufficient without the use of the work-holder member already spoken of but not yet described.

In most cases, and in all cases where the chart is circular, and there are curved lines which require the additional work-holder member 32 to be added to the machine.

The turn-board has a diametral T-groove 102 across its upper surface and in this T-groove I rotably mount a screw 103 in front and rear end bearings 104 and 105 so that the screw axis lies along the length of the groove. A nut member 106 (Fig. 7) on the screw slides in the lower portion of the T- groove and travels along the groove when the screw is rotated. The screw, nut member and the bearings remain permanently in the groove and lie below the narrow portion 107 of the groove.

A metal strip 108 slides in the neck 107 of the T-groove, and is removably screwed to the nut at 109 with the nut at a position midway between opposite ends of the strip.

An upwardly projecting pivot post 110 is rigidly fastened at 111 to the center of the strip 108 and receives the hub 112 of the rotatable work-holder 32 and the head of a screw 113 in the end of the pivot post and suitably countersunk in the surface of the work-holder holds the work-holder from removal from its pivot post.

Figure 7:
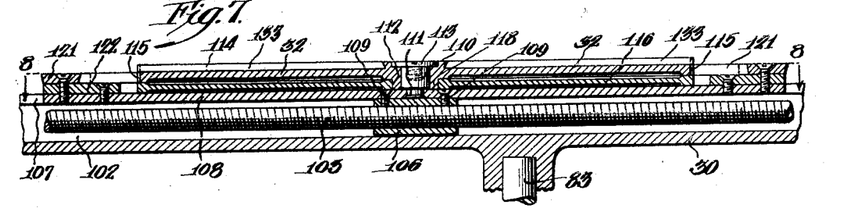
Figure 7 is an enlarged fragmentary section of turn-table structure as shown in Figures 1 and 2 and corresponds to a section upon line 7—7 of Figure 1 or 7—7 of Figure 8.
Figure 8:
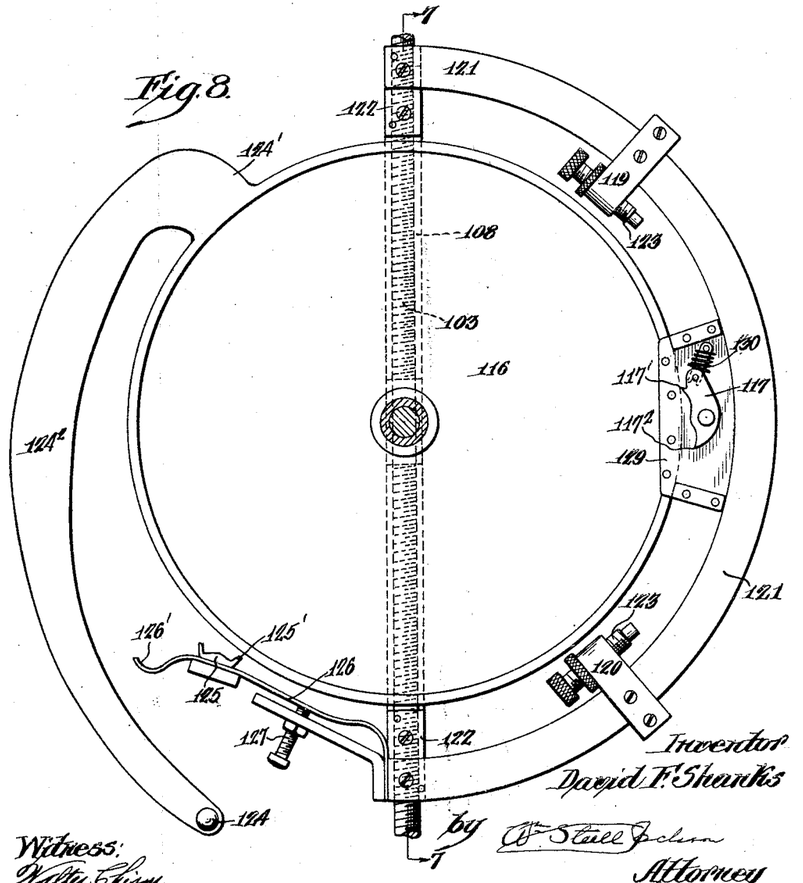
Figure 8 is a horizontal section of Figure 7 taken upon the line 8—8 thereof.

The rotatable work-holder-mechanism includes the work-holder proper, which comprises a wheel 114 having ratchet teeth 115 around its periphery, and reversible adjustable ratchet mechanism for feeding the wheel to any desired extent in either direction best seen in Figures 1, 7 and 8.

A wheel-like member 116 carrying a double pawl 117 is pivotally mounted on a reduced portion 118 of the hub of the work-holder lying beneath the rotatable wheel 114.

The member 116 is adapted to be oscillated to an extent limited by the positions of adjustable stops 119 and 120 mounted upon an arc-shaped supporting strip 121 fastened to opposite ends of the strip 108 that fits into the upper portion of the T-groove.

The supporting strip is preferably raised somewhat above the upper surface of the turn-board by spacers 122 placed between the adjoining ends of the strips 108 and 121.

The stops 119 and 120 are free to move lengthwise of strip 121 and are clamped at any desired position along the strip 121. Exact adjustment of the arcuate distance between the stops is made by changing the position of adjustable set screws 123, each step being provided with a screw 123.

The pawl-carrying-member 116 is provided with a handle 124 for use in oscillating the ratchet feed.

The connection 124' between the handle 124 and the member 116 limits the angular movement of the member to somewhat less than one hundred and eighty degrees, as it oscillates in the circumferential space between the spacers. As I prefer to have the handle 124 operate along a path near the front of the work-holder, where it is easily accessible to the operator, I provide the handle with an arm $124^2$ connecting to a rearward portion of the member 116.

One end of the semi-circular strip 121 carries a stop 125 of any suitable type having a tooth 125' adapted to engage with any one of the teeth 115 to prevent rotation of the wheel 114 in either direction. The lock is mounted upon a spring 126 whose tension is determined by a screw 127. When it is desirable to shift the table the stop is released by hand operation of the spring and 126'. The initial setting of the lock position with respect to the teeth with which it engages is easily accomplished by adjustment of stops 119 and 120.

The rotatable work-holder 30 is adapted to be moved to any position across the turn-board by rotating the screw 103, which is accomplished by means of any suitable handle upon a non-circular end 128 of the screw.

The rotatable wheel may be turned on its own axis in steps in either direction through arcs of any desired definite angular distance by oscillating the handle 124 so that the pawl 117 will oscillate between the stops 119 and 120.

This pawl is pivoted upon any suitable part 129 of the oscillatory member 116 so as to present ratchet tooth 117' to the adjacent work-holder teeth to carry the work-holder in one direction or to allow it to slip in that direction, or to present ratchet tooth $117^2$ to the teeth for a like use and purpose in transferring or permitting slip in the opposite direction. The part 129 engages stops 119 and 120.

The position of the work-holder with respect to the turn-board is shown by an indicator 131 fastened to the strip 121 upon a suitable scale 132 fastened upon the turn-board parallel to the direction of movement of the work-holder.

The three-position double pawl member 117 (Figure 8) carried by the oscillating wheel member 116 operates upon the ratchet teeth 115 around the work-holder and is adapted to reversal by shifting it to one side or the other of the dead center of a spring guided by a pivoted yoke bar, or to occupy an intermediate dead center position at which both horns of the double pawl are out of engagement with the ratchet teeth.

The upper side of the rotatable work-holder is provided with radial T-grooves 133 generally similar to the corresponding radial grooves 96 of the turn-board and for use in holding the work to place upon the holder 32. Clamps 134 like the clamps 98 already described and shown in Figure 3, are used at any positions that may be needful to properly fasten the work to place.

It will be seen that the work-holder wheel 114 is free to turn with respect to the oscillating pawl-carrying member 116 and that both of these members oscillate about the same axis upon the pivot post 110 from the strip 108. Both are positioned by the nut 106 upon the screw 103 to different positions across the turn-board.

Figures 9, 10, 11:
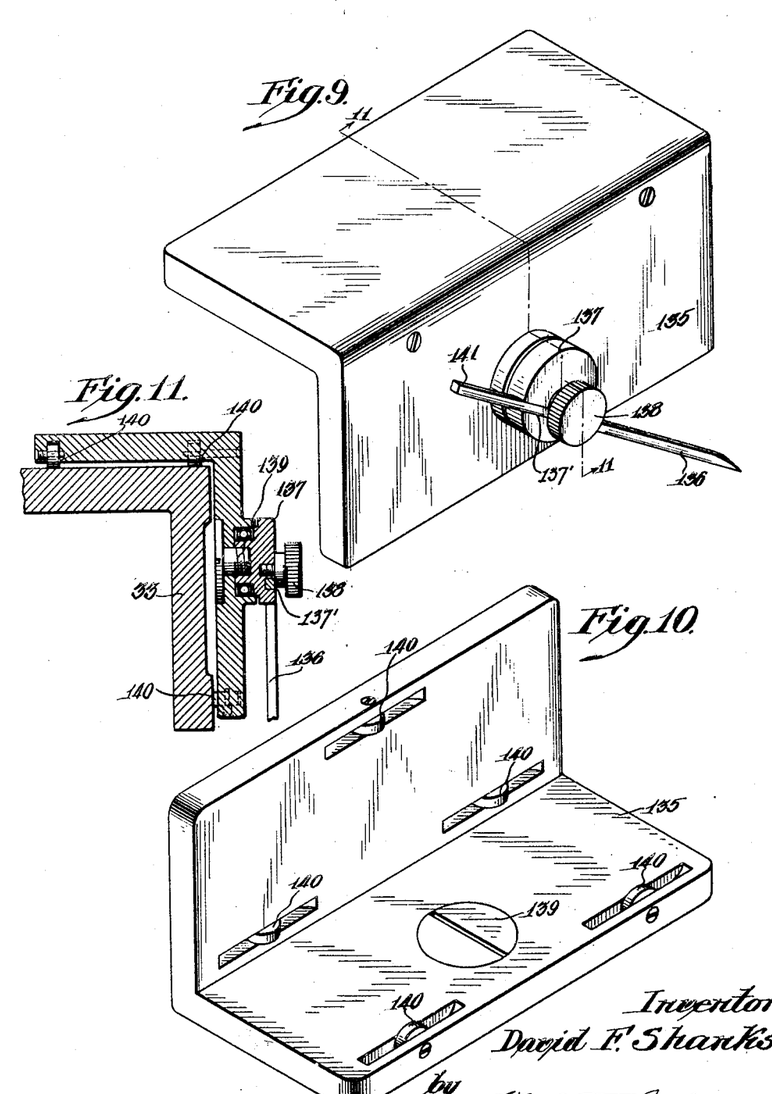
Figures 9 and 10 are enlarged upper and lower perspective views of a detail shown in Figure 1.
Figure 11 is a section taken upon the line 11—11 of Figure 9.

The tool for engraving straight or curved lines is illustrated in its carrier 135 in Figures 9 to 11.

The cutting tool 136 is clamped in a groove

137' within a cylindrical holder 137 by means of a knurled screw 138. The holder is pivotally mounted in ball bearings 139 in the side of the carriage 135.

The carrier 135 is of heavy angle section and is provided with suitable supporting wheels 140 along the top and side so that it may be readily moved along the beam 33, but be sufficiently heavy to remain stationary when engraving curved lines without need for any clamping to place.

During engraving whether cutting or scribing and whether the tool be moving or stationary, the tool is usually kept to its duty by the hand of the operator either upon the tool as at 141 or upon the carrier and it has been found that an operator soon learns to work with extreme accuracy in this way. The tool carrier 135 lifts freely on and off the beam support 33. The direction of relative movement between the work and tool during cutting corresponds with tool movement to the right in Figure 9, so that the forwardly sloping tool plows that work during scribing the direction of relative movement is reversed so that the point of the tool rides backwardly over the work.

In practice the heavy lines are made by cutting and the light lines by scribing.

I show a gas flame 178 below the table for use in tempering the wax. It sometimes happens that the wax on a casing is unduly hard at low temperature and the flame 178 is used whenever it is desired to soften the temper of the wax.

I have found it sometimes also desirable to temper the wax locally, either by somewhat warming the tool or by warming the wax near the tool and provide the beam 33 (Figure 1) with a gas jet 179 for this purpose. The pipe is adjustable along and removable from the beam and will in many cases not be used.

While the widest application of my invention is without doubt in the manufacture of engraved wax charts for use in the manufacture of circular and rectangular plates for printing time recorder charts I am well aware that the invention may be applied to many other uses both in the manufacture of wax casings for plates other than for printing charts and for any other uses to which it may be adapted.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. In a wax engraving machine, a turn-board adapted to angular movement in its own plane about a pivotal axis, a work-holder thereon, pivot connection between the holder and board having an axis parallel to and offset from the axis of the work-holder adapting the work-holder to angular movement about an axis offset from the axis of the turn-board and a tool support adapted to present a stationary tool to the work during angular movement of the board about its own axis.

2. In a wax engraving machine, a turn-board adapted to angular movement in its own plane about a pivotal axis, a work-holder thereon, pivot connection between the work-holder and board radially adjustable with respect to the turn-board and a tool support adapted to present a stationary tool to the work during angular movement of the board about its own axis.

3. In a machine adapted to engrave arcuate division lines upon a wax casing, a turn-board having a range of angular movement in its own plane about a pivotal axis, a work-holder mounted on the turn-board, a pivot connection between the turn-board and work-holder axially offset from the pivotal axis of the turn-board, a beam movable laterally transversely of the board in a plane parallel to that of the board, a carrier adjustable along the beam, a holder for presenting a forwardly sloping tool to the work and a horizontal pivot connection between the holder and carrier for varying the vertical position of the cutting point of the tool with respect to the work surface, in combination with means for registering the work-holder in successive angular positions having the angular spacing of the desired arcuate division lines.

4. In a device for cutting wax charts, a frame, a rotatable table mounted upon the frame, a rotatable chart holder mounted upon the table and means for moving the chart holder with respect to the table to separate their axes laterally to any desired extent.

5. In a device for cutting wax charts, a frame, a rotatable table mounted upon the frame, a rotatable chart-holder mounted upon the table, means for moving the chart-holder with respect to the table to separate their axes laterally to any desired extent, a tool-holder and a mount for the holder guiding the tool along straight lines over the surface of the chart holder.

6. In a machine for cutting wax charts, a frame, a rotatable table mounted upon the frame, a rotatable chart-holder mounted upon the table, screw means for moving the chart-holder parallel with the table to displace its axis from the axis of the table to any desired extent, means for engaging one of the rotatable members to move it through an arc successively to determine the path of marking upon the chart, and means for adjusting the arc of movement.

7. In a machine for cutting wax charts, a table adapted to rotate about a fixed axis, a chart-holder carried by the table and adapted to rotate about an axis, connections between the two adapted to shift the chart-holder with respect to the table to any extent of relative displacement of the axis, a tool-holder and a guide for the tool-holder upon which the tool-holder is freely movable, adapted to guide the tool-holder in straight line movement across the chart and to permit it to be held while the chart is turned to cut straight lines and curved lines in the chart.

8. In a machine for cutting wax charts, a table adapted to rotate about a fixed axis, a chart-holder carried by the table and adapted to rotate about an axis, connections between the two, adapted to shift the chart-holder with respect to the table to any extent of relative displacement of the axis, a tool holder, a guide for the tool-holder adapted to guide it in horizontal movement across the chart, means for moving the guide step-by-step perpendicularly to its own length to change the horizontal path of tool movement and an adjustment of the length of the steps of movement.

9. In a wax engraving machine, a table, a turn-board pivotally mounted thereon and having a diametral T groove upon its upper side, a nut axially parallel with the groove and adapted to travel along in the groove, a bearing mounted on the turn-board near each end of the groove and in the groove, a screw threading the nut rotatably mounted in the bearings, and a work-holder pivotally supported upon the nut and adjustable across the turn-board by rotation of the screw.

10. In a wax engraving machine, a table, a turn-board pivotally mounted thereon and having a diametral T groove upon its upper side, a nut axially parallel with the groove and adapted to travel along in the groove, a bearing mounted on the turn-board near each end of the groove and in the groove, a screw threading the nut rotatably mounted in the bearings, a strip carried by the nut fitting the upper narrow portion of the groove and extending along the groove in both directions away from the nut, and a circular work-holder intermediate the ends of the strip and having a hub pivotally supported upon the strip and the holder adjustable across the turn-board by rotating the screw, in combination with a ratchet hand feed of the angular position of the work-holder about its own axis comprising ratchet teeth around the periphery of the holder, a pawl-carrying member mounted to swing about the axis of the work-holder, the pawl making ratchet engagement with the teeth on the holder, and a second pawl engaging the teeth in reverse direction from the first and supported on the strip.

11. In a wax engraving machine, a table, a turn-board pivotally mounted thereon and having a diametral groove upon the upper side, a nut adapted to travel along in the groove, bearings mounted on the turn-board near the respective ends of the groove, a screw threading the nut and rotatably mounted in the bearings, a circular work-holder connected with and operated by the nut, a ratchet hand feed for adjusting the work-holder about its own axis including operating pawls, a pair of relatively adjustable stops mounted on the connection and co-operating abutments on the pawl-carrying member whereby angular oscillation of the latter member may be limited by engagement between the abutments and the stops.

12. In a wax engraving machine, a table, a turn-board rotatably mounted thereon and adapted to hold a wax chart, pin and socket means for definitely setting the turn-board in different angular positions relatively spaced ninety degrees, a hand-wheel adapted to angularly move the turn-board when the pin and socket connection is in release, screws rigidly carried by the turn-table along opposite sides thereof parallel to the plane of the turn-board and to one another, a mitre gear threaded axially upon each screw, a transverse rotatable shaft across the screws, a mitre gear rigidly fastened to the shaft at each screw meshing with the gear of the screw, a beam above the table along the shaft, housing the mitre gears and supported by the screws, and an adjustable ratchet feed of the screw.

13. In a machine for cutting wax charts, a mount for a chart adapting the chart to rotate and also to revolve, in combination with a bar adapted to be located across the chart, a cutting tool and a carrier for the cutting tool mounted to travel upon the bar and free for hand movement longitudinally of the bar for the purpose of cutting with the tool or for placing the tool in position to cut a chart when the latter is rotated or revolved.

14. In a machine for use in manufacturing wax chart or the like, a turn-board, a beam above and adjustable across the board, an inverted L member hooking over and slidable along the beam, and a tool-holder horizontally pivoted to the L member.

15. In a machine for use in manufacturing wax charts or the like, a turn-board, a beam above and adjustable across the board, an inverted heavy L member hooking over the beam, a tool-holder horizontally loosely pivoted to the L member and supporting wheels on the member between the member and the beam, the member being adapted to remain stationary by reason of its weight and inertia while the tool is engaging the work yet adapted to be readily rolled along the beam by the hand of an operator.

16. In a wax engraving machine, a turn-board adapted to angular movement in its own plane about a pivotal axis, a work holder a vertical pivot connection between the holder and board axially offset with respect to the turn-board, a tool support adapted to present a stationary tool to the work during angular movement of the board about its own axis and adjustable reversible ratchet mechanism adapted to angularly move the workholder by definite steps in either direction about its own axis.

DAVID F. SHANKS.